(12) United States Patent
Lillamand et al.

(10) Patent No.: US 10,271,535 B2
(45) Date of Patent: Apr. 30, 2019

(54) APPARATUS AND METHOD FOR TRAPPING FLYING INSECT PESTS

(71) Applicant: TECHNO BAM, Maillane (FR)

(72) Inventors: Simon Lillamand, Maillane (FR); Pierre Bellagambi, Saint Remy de Provence (FR)

(73) Assignee: TECHNO BAM, Maillane (FR)

(*) Notice: Subject to any disclaimer, the term of this patent is extended or adjusted under 35 U.S.C. 154(b) by 277 days.

(21) Appl. No.: 15/502,291

(22) PCT Filed: Aug. 7, 2015

(86) PCT No.: PCT/FR2015/052180
§ 371 (c)(1),
(2) Date: Feb. 7, 2017

(87) PCT Pub. No.: WO2016/020627
PCT Pub. Date: Feb. 11, 2016

(65) Prior Publication Data
US 2017/0231210 A1 Aug. 17, 2017

(30) Foreign Application Priority Data
Aug. 7, 2014 (FR) .................................... 14 57683

(51) Int. Cl.
A01M 1/06 (2006.01)
A01M 1/02 (2006.01)
A01M 1/10 (2006.01)

(52) U.S. Cl.
CPC .............. *A01M 1/06* (2013.01); *A01M 1/023* (2013.01); *A01M 1/106* (2013.01)

(58) Field of Classification Search
CPC ......... A01M 1/06; A01M 1/023; A01M 1/106
See application file for complete search history.

(56) References Cited

U.S. PATENT DOCUMENTS 5,417,009 A * 5/1995 Butler ..................... A01M 1/08
43/113
5,669,176 A * 9/1997 Miller ................... A01M 1/023
43/107
5,813,166 A * 9/1998 Wigton ................. A01M 1/023
43/107

(Continued)

FOREIGN PATENT DOCUMENTS

CA 2527777 A1 * 7/2006 ............ A01M 1/023
EP 1049373 B1 11/2000
(Continued)

OTHER PUBLICATIONS

International Search Report dated Nov. 30, 2015 in corresponding Application No. PCT/FR2015/052180; 2 pgs.

*Primary Examiner* — Christopher P Ellis
(74) *Attorney, Agent, or Firm* — Maier & Maier, PLLC

(57) ABSTRACT

An apparatus for trapping flying insect pests, including: a device for diffusing in the surrounding ambient air a gaseous lure the composition of which is suitable for attracting the insects; a device for sucking a flow of surrounding ambient air containing the insects attracted by the diffused gaseous lure, an insect trap arranged with the suction device so the insects sucked by said device are retained in said trap.

12 Claims, 2 Drawing Sheets

(56) References Cited

U.S. PATENT DOCUMENTS

| | | | |
|---|---|---|---|
| 6,854,208 B1 * | 2/2005 | Chuang | A01M 1/2027 261/84 |
| 6,898,896 B1 * | 5/2005 | McBride | A01M 1/023 43/107 |
| 7,363,745 B2 * | 4/2008 | Hsin-Chang | A01M 1/02 43/113 |
| 7,921,594 B2 * | 4/2011 | Ropiak | A01M 1/023 43/107 |
| 2003/0208951 A1 * | 11/2003 | Bossler | A01M 1/02 43/107 |
| 2004/0154213 A1 | 8/2004 | Mosher | |
| 2005/0252075 A1 * | 11/2005 | Achor | A01M 1/023 43/139 |
| 2007/0006520 A1 | 1/2007 | Durand | |
| 2008/0244959 A1 * | 10/2008 | Schinazi | A01M 1/023 43/107 |
| 2009/0162253 A1 | 6/2009 | Porchia et al. | |
| 2011/0283597 A1 * | 11/2011 | Coventry | A01M 1/023 43/107 |
| 2013/0064679 A1 * | 3/2013 | Tsai | A01M 1/06 416/247 R |
| 2014/0165452 A1 * | 6/2014 | Rocha | A01M 1/08 43/113 |

FOREIGN PATENT DOCUMENTS

| | | | | |
|---|---|---|---|---|
| WO | WO-2009012948 A1 * | 1/2009 | | A01M 1/06 |
| WO | WO-2010099390 A1 * | 9/2010 | | A01M 1/023 |
| WO | WO-2011123004 A1 * | 10/2011 | | A01M 1/02 |

* cited by examiner

APPARATUS AND METHOD FOR TRAPPING FLYING INSECT PESTS

TECHNICAL FIELD OF THE INVENTION

The subject matter of the invention is an apparatus and method for trapping flying insect pests.

It relates to the technical field of systems for attracting and capturing flying insect pests, in particular nematocerous dipteran insects (bloodsuckers) and hematophagous dipterans (biters).

PRIOR ART

In regions particularly exposed to the presence of mosquitoes, communities spend considerable sums on carrying out preventive treatments of destruction of mosquito larvae.

Various techniques for combating mosquitoes exist at the present time:

the larvicidal technique: this involves the use of chemical or biological products that act on the mosquitoes at the immature stage in order to restrict their development. This technique is effective for restricting the development of mosquitoes since their larvae in general occupy a minimum geographical space that can easily be located. However, it is very expensive. In addition, the frequent use of larvicides may cause a phenomenon of habituation and resistance to the product used;

the insecticide technique: this aims to eliminate adult mosquitoes with synthetic or natural chemical substances (for example pyrethroids). However, this technique gives rise to considerable costs and involves difficult logistics (air or land spraying). In addition, the insecticidal substances may also have harmful effects on the health of humans and animals. Moreover, the repeated use thereof presents a risk of resistance;

the repellant technique: this aims to divert mosquitoes from their potential target by interfering with their location faculties with synthetic or natural chemical substances (for example DEET (N,N-diethyl-3-methylbenzamide). However, this technique does not generally kill the mosquitoes but repels them from their prey. In addition, few studies on long-term toxicity have been carried out on the repellants currently available on the market.

Environmental studies demonstrate that all chemical products degrade badly and have a tendency to diffuse in the ecosystem. In addition to being harmful for the fauna in the treated zones by impacting on the base of the food chain, getting rid of mosquitoes deals only with wild areas without treating urbanized zones where nuisances are the most important or where the risks of proliferation of viral infection related to mosquitoes are the greatest. The chemical products used reach and destroy the natural predators of mosquitoes, which has the effect of substantially reducing the overall efficacy of mosquito-ridding campaigns.

Protecting habitation zones situated in regions infected by mosquitoes therefore depends on seeking less ecologically aggressive means.

Apparatuses capable of providing a suitable alternative response, and corresponding to a real need, are known. These apparatuses generally comprise: —a device for diffusing in the ambient air a gaseous lure the composition of which is suitable for attracting insects; —a suction pipe for suckingan airflow containing the insects attracted by the gaseous lure diffused; —an insect trap arranged with the suction pipe so that the insects sucked by said pipe are retained in said trap. This type of apparatus is an alternative to mosquito ridding by larvicide.

More particularly, the patent document EP 1.049.373 (AMERICAN BIOPHYSICS CORP) describes an apparatus that includes an insect trap comprising an inlet enabling the insects to enter therein and a lure-diffusion system connected to a carbon dioxide ($CO_2$) gas source. This diffusion system is disposed so as to cool the hot $CO_2$ and to diffuse an insect lure composed of the cooled $CO_2$ close to the entry to the trap, at a temperature higher than ambient temperature and lower than approximately 45° C. In practice, this apparatus has limited effectiveness, which is in particular due to continuous diffusion of the lure.

The patent document US 2007/0006520 (DURAND) describes a similar apparatus. The lure is diffused in the form of a mist. This mist is diffused sequentially in order to simulate the breathing of a mammal at that point. Attracted by the lure, the insects are then sucked and trapped.

This apparatus is more effective than the one described above. It does however have several drawbacks. This is because generating the mist is particularly complex and tricky to implement. Equally, given that the suction pipe is directly in line with the pipe ejecting a lure, some of the latter is taken up in the sucked airflow. This contributes to reducing the overall efficacy of the system, the action radius of the lure being limited.

The invention aims to remedy this state of affairs. In particular, one object of the invention is to diffuse the lure in the environment in a simpler and more effective manner, so as to improve the capture of insects.

Another objective of the invention is to propose an apparatus the radius of action of which is greater than those of the aforementioned apparatuses known from the prior art.

Yet another objective of the invention is to propose an apparatus of simple design, inexpensive, easy to use and easy to handle.

DISCLOSURE OF THE INVENTION

The solution proposed by the invention is an apparatus for trapping flying insect pests, comprising:

a device for diffusing in the surrounding ambient air a gaseous lure the composition of which is suitable for attracting the insects;

a device for sucking a flow of surrounding ambient air containing the insects attracted by the diffused gaseous lure, an insect trap arranged with the suction device so that the insects sucked by said device are retained in said trap.

This apparatus is remarkable in that the diffusion device comprises:

a hollow chamber having at least one orifice emerging in the surrounding ambient air, a device for dispensing the gaseous lure inside the hollow chamber, at least a portion of the compounds of the lure being dispensed continuously in said chamber, a device for generating an airflow in the hollow chamber so as to expel the gaseous lure out of said chamber, through the orifice, said airflow being generated sequentially.

In practice, this lure-diffusion device is particularly effective and simple to implement. While being expired, the airflow becomes quickly and effectively charged with the concentrated lure in the hollow chamber, said lure mixing homogeneously in said flow. The result is a more effective diffusion of the lure and better capture of the insects.

Other advantageous features of the invention are listed below. Each of these features can be considered alone or in combination with the remarkable features defined above, and may where applicable be the subject of divisional patent applications:

the expired airflow loaded with gaseous lure is preferentially diffused in a direction that is different from that of the surrounding ambient airflow sucked by the suction device, advantageously, the suction device comprises a suction pipe having an inlet through which the insects are sucked; the hollow chamber is arranged above this inlet, a cap structure advantageously surmounts the inlet of the suction pipe, said structure being suitable for forming a physical barrier that prevents the expired airflow containing gaseous lure from being taken up in the airflows sucked by the suction device, the hollow chamber and the inlet are preferentially situated at a distance of less than or equal to 3 m, preferably between 1 m and 3 m, from the ground on which said apparatus rests, the suction device preferentially sucks continuously the surrounding ambient airflow containing the insects attracted by the diffused gaseous lure, the flow rate of a surrounding ambient airflow sucked by the suction device is greater than the flow rate of the airflow containing gaseous lure that is expired from the hollow chamber, the gaseous lure preferentially consists of a mixture of carbon dioxide gas and volatile pheromones.

the pheromones may be contained or impregnated in a pheromone carrier, said carrier being placed in the airflow generated in the hollow chamber so that said pheromones evaporate as said flow passes, preferably the pheromones are used in the liquid state to impregnate the pheromone carrier, said carrier being porous.

a source of carbon dioxide gas may be adapted to continuously diffuse carbon dioxide gas in the hollow chamber, the hollow chamber may be formed by, or contain, a refractory material suitable for storing heat and restoring it to the airflow generated in said chamber, said apparatus may further comprise an electronic card suitable for providing its autonomous or programmed functioning.

Another aspect of the invention relates to a method for trapping flying insect pests, consisting of:

diffusing in the surrounding ambient air a gaseous lure the composition of which is suitable for attracting the insects, sucking a surrounding ambient airflow containing the insects attracted by the diffused gaseous lure, retaining the sucked insects in a trap.

This method is remarkable in that it further comprises the steps consisting of:

dispensing, continuously, all or part of the gaseous lure inside a hollow chamber, generating sequentially an airflow in the hollow chamber in order to expel the gaseous lure out of said chamber, into the surrounding ambient air.

DESCRIPTION OF THE FIGURES

Other advantages and features of the invention will emerge more clearly from a reading of the description of a preferred embodiment that follows, with reference to the accompanying drawings, and produced by way of indicative and non-limitative examples and in which.

PREFERRED EMBODIMENTS OF THE INVENTION

The apparatus that is the subject matter of the invention is intended to trap nematocerous dipteran insects (bloodsuckers) such as mosquitoes and hematophagous dipteran insects (ones that bite their prey) such as blackflies. The principle consists of simulating the presence and breathing of a mammal at that point. More generally the invention aims to trap flying insect pests. Attracted by a lure, the target insects are then sucked and captured. Thus trapped, the insects can be either killed or recovered alive, for example for subsequent scientific study.

Figure 1:
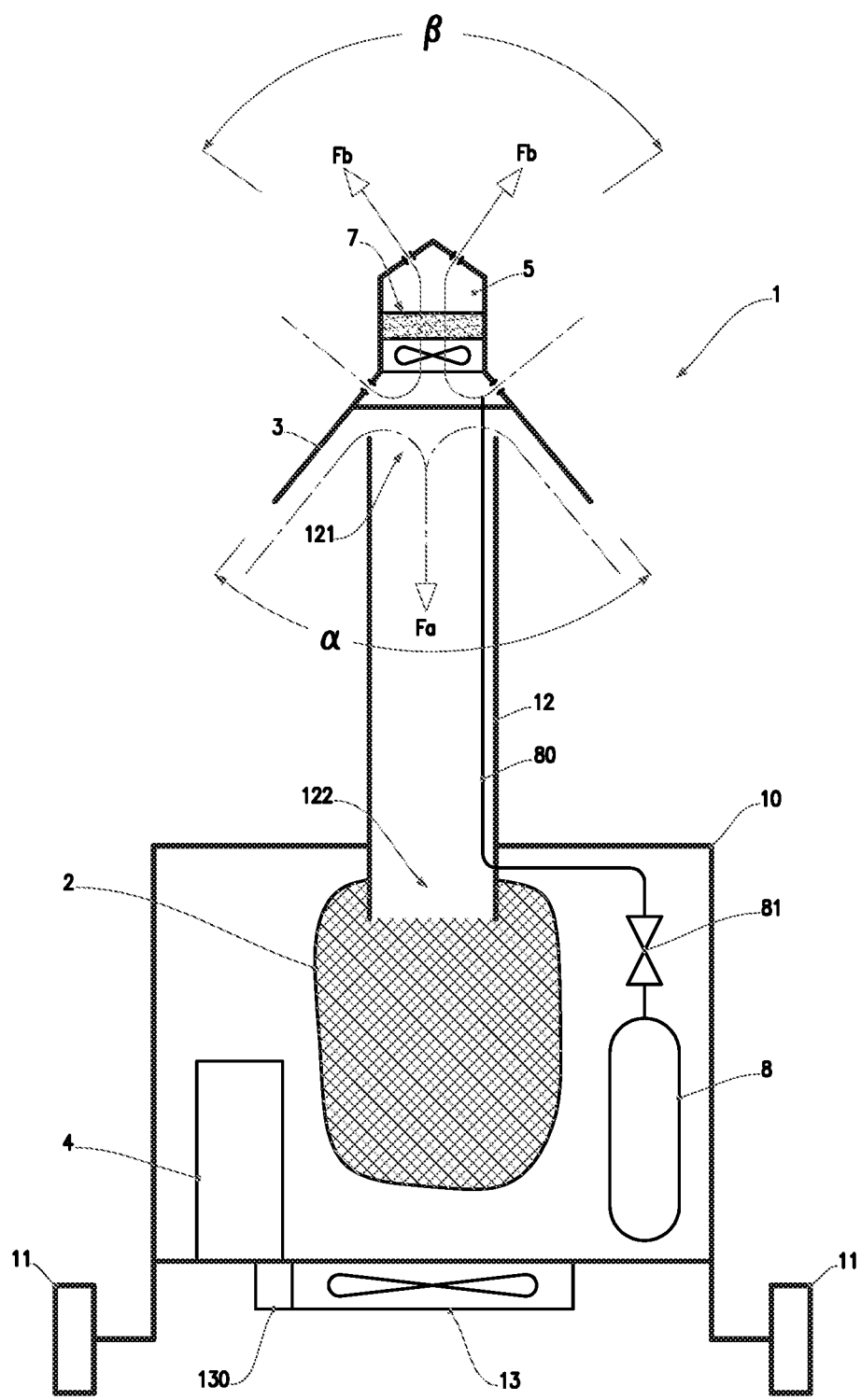
FIG. 1 is a schematic view in cross section of an apparatus according to the invention.

In FIG. 1, the apparatus 1 comprises a frame structure 10 that can be fixed to the ground or be provided with wheels 11 so as to make it mobile and/or movable.

According to a variant of the invention, provision can also be made for the frame structure to be buried in the ground.

The frame 10 may be produced from steel (e.g. stainless steel), concrete or plastics material (e.g. PVC). It may have a parallelepipedal or cylindrical form. Its height varies for example from 10 cm to 1.50 m. Its length and/or width varies for example from 10 cm to 50 cm.

In FIG. 1, the frame 10 is in the form of a hermetically closed box. A hatch and/or a door mounted so as to be able to move between an open position and a closed position is advantageously provided for allowing access to the inside of such frame.

The apparatus 1 is self-contained. It is preferentially supplied electrically by means of a battery 4 coupled to one or more solar panels and/or a wind turbine. It may also be recharged simply by connecting it to an electrical supply of the mains type. This battery 4 is advantageously inserted in the frame 10. The battery 4 may be coupled to a time delay adjusted so as to deactivate the apparatus 1 during periods when the insects are inactive, for example from midnight to 4 o'clock in the morning.

Naturally, provision can also be made for coupling the apparatus 1, including the battery 4, to the public lighting system. In this case, the apparatus 1 functions, during lighting periods, by virtue of the electricity distribution network, and outside these periods by means of the battery 4. The latter being adapted to recharge during the lighting periods.

The frame 10 is surmounted by a mast, at the end of which there are disposed the suction device and the lure diffusion device described earlier in the description. Advantageously, and to provide better visibility for the targeted insect pests, these two devices are situated at a height.

In FIG. 1, the mast is in the form of a rectilinear tube forming an suction pipe 12. This can be produced from metal (e.g. stainless steel) or plastics material (e.g. PVC). On the accompanying figures, the top 121 and bottom 122 ends are open. Provision could however be made to have a blind top end 121, at least one suction orifice being however provided at this end.

The bottom end 122 of the pipe 12 is fixed to the frame 10, by welding, screwing or a snapping-on solution. This pipe 12 may be circular, oval, rectangular, etc in cross section. It may be produced in a single piece, or several pieces, for example fitted in one another. The latter solution makes it possible to adjust the length of the pipe 12 very simply. Its diameter may be between 5 cm and 20 cm. Its length may vary from 1 cm to 1.50 m, preferentially from 50 cm to 1.50 m.

The bottom end 122 of the pipe 12 emerges in an insect trap 2. The latter is in the form of a flexible mesh bag or net. It is attached, for example by means of a gripping cord, to the bottom end 122.

This net 2 is advantageously reusable, and can be recovered and changed by means of the aforementioned door provided in the frame 10. It may optionally be impregnated with a poison to kill the trapped insects. In any event, even in the absence of poison, the latter die from dehydration and/or hunger. The net 2 may be associated with a sensor for indicating that it is full.

The frame 10 is associated with a suction means 13, preferentially in the form of a fan. This suction means 13 is suitable for sucking the ambient air at a rate of between 15 m$^3$/hour and 500 m$^3$/hour, preferentially approximately 350 m$^3$/hour. It creates a negative pressure in the frame 10 and aspirates the surrounding ambient air through the inlet 121 of the pipe 12, through the net 2. The flow of ambient air sucked is shown schematically by the arrow referenced Fa in the accompanying figures. In practice, the fan 13 comprises a motor that draws an electrical power signal from the battery 4 to turn its blades, thus generating the flow Fa. The fan 13 is coupled to a control member 130 for controlling its functioning.

Figure 2:
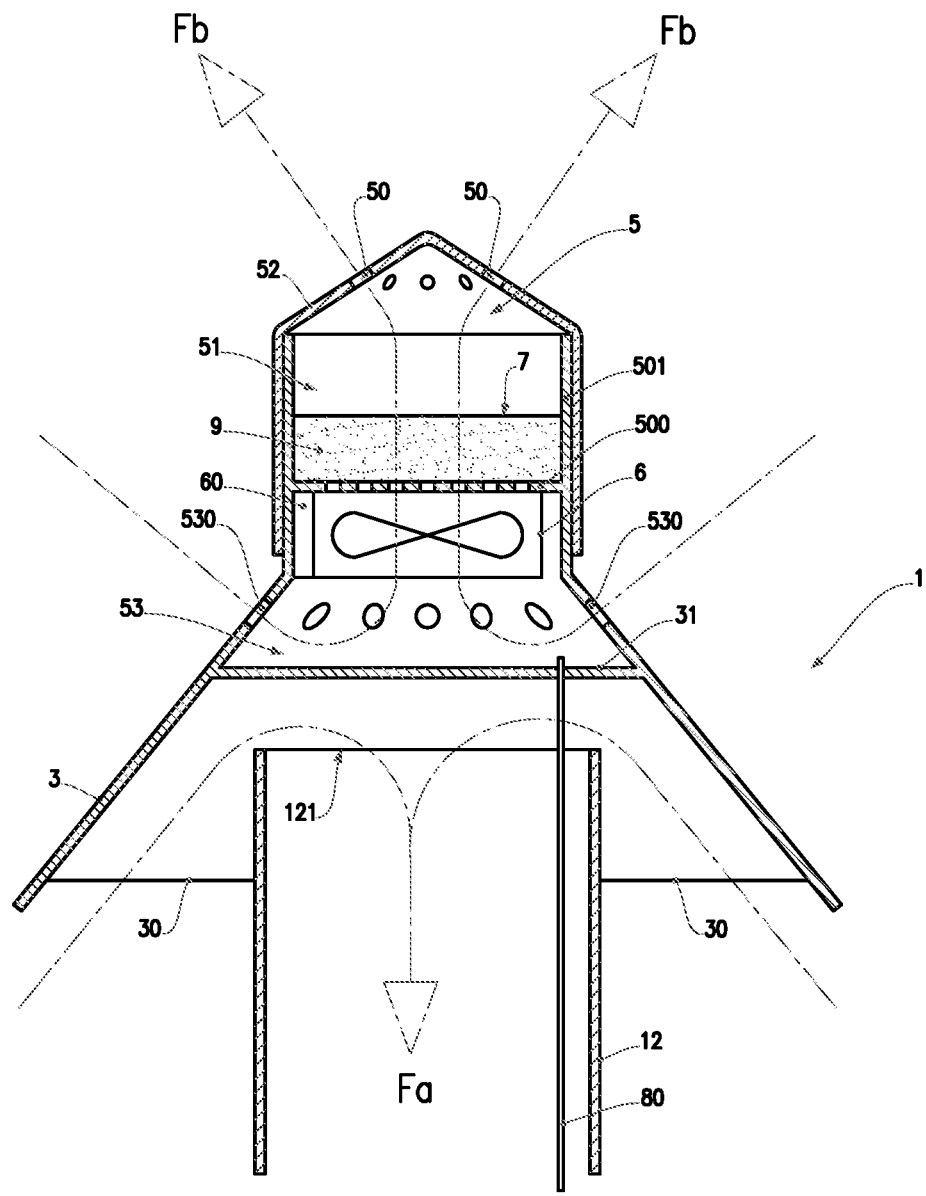
FIG. 2 shows in detail an example embodiment of the hollow chamber in which the lure is dispensed.

In FIGS. 1 and 2, the inlet 121 of the pipe 12 is surmounted by a cone-shaped cap structure 3. This is produced from plastics material (e.g. PVC) or bent sheet metal (e.g. stainless steel). It is attached at the inlet 121 and held in position by means of attachment lugs 30, or by any other similar attachment suiting a person skilled in the art.

This cap structure 3 has several functions: it protects the inlet 121 from weather, preventing in particular rainwater from entering the pipe 12; it also makes it possible to channel the sucked airflow Fa, the latter flowing from the bottom of the apparatus 1 to the top of the pipe 12; it also forms a physical barrier that prevents the diffused lure from being taken up again in the suction pipe 12.

More particularly, the structure 3 is suitable for the flow Fa to be sucked at a solid angle $\alpha$ between 20° and 90°; preferentially between 20° and 60°.

The apparatus 1 also comprises a device for diffusing, in the surrounding ambient air, a gaseous lure the composition of which is suitable for attracting insects. In the accompanying figures, this diffuser is coaxial with the inlet 121.

This diffusion device comprises a hollow chamber 5. This is situated above the suction pipe 12, and in particular above the inlet 121. More particularly, this hollow chamber 5 is situated at the top end of the cap structure 3. It has orifices 50 emerging in the surrounding ambient air. These orifices 50 are disposed homogeneously all around the chamber 5.

Referring more particularly to FIG. 2, the chamber 5 comprises a vessel 51 surmounted by a dome or cover 52. The latter is preferable removable so as to allow easy access to the inside of the vessel 51. These two parts 51, 52 are produced from plastics material (e.g. PVC) or metal (e.g. stainless steel).

The vessel 51 has a cylindrical or parallelepipedal shape and extends vertically towards the top of the apparatus 1. It has a bottom 500 and lateral walls 501. It is produced in line with the structure 3, and can be obtained during the pressing or molding of the latter. Its diameter corresponds substantially to that of the pipe 12. Its height varies for example from 2 cm to 20 cm. The cover 52 has a shape complementary to that of the vessel 1 so as to be able to fit onto the lateral walls 501 of the latter. In the accompanying figures, the cover 52 has a conical shape, but could have any other shape suiting a person skilled in the art, for example hemispherical or cylindrical. The orifices 50 are produced on the cover 52.

The vessel 51 is associated with a means 6 for generating an airflow in the chamber 5. This means 6 is preferentially in the form of a fan. It is suitable for blowing out an airflow at a rate of between 10 m$^3$/hour and 300 m$^3$/hour, preferentially approximately 150 m$^3$/hour. It aspirates the ambient air from orifices 530 produced on the structure 3, under the vessel 51. A sealed partition 31 is mounted in the structure 3 so as to separate these orifices 530 from the inlet 121 of the pipe 12. This partition 31 prevents the airflow sucked by the fan 6 being taken up in the airflow Fa sucked through the inlet 121 of the pipe 12. The partition 31, the walls of the structure 3 and the bottom 500 of the vessel 51 delimit an intermediate chamber 53, situate under the vessel 51, and in which the orifices 530 are produced. This intermediate chamber 53 is a subchamber of the hollow chamber 5. The airflow sucked by the fan 6 therefore passes inside the intermediate chamber 53, through the orifices 530, and is injected into the chamber 5, from which it emerges through the orifices 50. In the accompanying figures, the airflow thus blown out is show schematically by the arrow referenced Fb. The orifices 50 are oriented all around the chamber 5 and oriented so that the flow Fb is blown out at a solid angle $\beta$ of between 20° and 90°; preferentially between 20° and 60°.

In practice, the fan 6 comprises a motor that draws an electric power sign from the battery 4 in order to turn its blades, thus generating the flow Fb. The fan 6 is coupled to a control member 60 for operating it sequentially. This control member 60 is for example in the form of a printed circuit integrating a time delay.

A device is provided for dispensing a gaseous lure inside the hollow chamber 5. The gaseous lure used is preferentially a mixture of $CO_2$ and volatile pheromones. The $CO_2$ induces on the insects a nerve stimulation similar to that produced by the breathing of a warm-blooded mammal. The pheromones used advantageously reproduce human skin odors. Use is made for example of octanol ($C_8H_{16}O$), in particular 1-Octen-3-ol (CAS #3391-86-4), and/or lactic acid. These pheromones giving good results. These compounds also avoid attracting non-harmful flying insects such as bees.

In FIG. 1, the frame 10 encloses a source 8 of $CO_2$. The latter is for example in the form of a pressurized rechargeable flask, the capacity of which is for example between 0.5 kg and 50 kg. A pipe 80 puts the flask 8 and the hollow chamber 5 in fluid communication, and more particularly the intermediate chamber 53. The $CO_2$ mixes in fact with the airflow Fb that is sucked by the fan 6. The pipe 80 can pass inside the pipe 12 or outside. A flowmeter 81 makes it possible to adjust the flow rate of $CO_2$ injected into the intermediate chamber 53. Very good results are obtained when this flow rate is between 0.15 liters/minute and 0.5 liters/minute. According to one advantageous feature of the invention, the $CO_2$ is diffused continuously in the hollow chamber 5, and more particularly in the intermediate chamber 53. Even when the fan 6 is inactive, the $CO_2$ diffuses in the vessel 51 by passing through the blades of said fan. The flask 8 may be associated with a sensor for warning an operator when it is empty.

The higher the temperature of the $CO_2$ compared with the temperature of the surrounding ambient air, the more attracted are the insects. It may therefore be advantageous to heat the $CO_2$ in advance before it is diffused. This heating is caused naturally by the instant rays of the sun that heat the hollow chamber 5. To amplify this natural phenomenon the hollow chamber 5 may be formed by, or contain, a refractory material (steel plates, lava stone, etc) suitable for storing heat and restoring it to the airflow Fb, and therefore to the $CO_2$.

In FIG. 2, the pheromones are disposed in a removable cartridge 9, said cartridge being placed in the vessel 51, above the fan 6. When the cartridge 9 is empty it suffices to the remove the cover 52 in order to take it off and replace it with another. The cartridge 9 may be associated with a sensor for warning an operator when it is empty.

In practice, the pheromones are contained or impregnated in a pheromone carrier that is placed in the airflow generated in the hollow chamber 5 by the fan 6.

This pheromone carrier is preferably chosen from (i) a candle; (ii) a porous carrier such as beads of polymer material, for example made from Pebax®, and wicks, made from fabric or wood, exploiting the capillarity effect; (iii) a carrier in the form of gel; and (iv) a plate made from more or less spongy absorbent material. Good results were obtained when the pheromone carrier is porous and the pheromones are used in the liquid state.

When this airflow Fb generated by the fan 6 passes, the pheromones evaporate. They do however diffuse continuously in the hollow chamber 5, even in the absence of this airflow Fb. This is mainly due to the fact that the hollow chamber 5 is heated by the incident rays of the sun, the temperature prevailing inside the vessel 1 causing continuous evaporation of the pheromones inside said chamber.

The functioning of the apparatus 1 and the capture technique will now be described in more detail. In accordance with the invention, all or part of the gaseous lure is dispensed continuously inside the hollow chamber 5. This gaseous lure is next expelled sequentially into the surrounding ambient air.

At least the pheromones, and preferentially the $CO_2$, are dispensed continuously inside the hollow chamber 5. The latter then becomes charged with the gaseous lure. The inventors have been able to demonstrate that a flow rate of pheromones of between 0.3 ml/day and 3 ml/day helps to improve the attraction properties of the lure.

When the fan 6 is actuated, the airflow Fb that it generates makes it possible to expel the gaseous lure out of the chamber 5, through the orifices 50. This airflow Fb mixes intimately with the concentrated gaseous lure in the hollow chamber 5. The inventors noted surprisingly that the attraction properties of this perfectly homogenized mixture were appreciably improved compared with the lures diffused according to the techniques described in the aforementioned patent applications.

In order to obtain a maximum concentration of lure inside the chamber 5, the orifices 50 may be equipped with obturator elements. These elements are removable, and mounted so as to be able to move between: —an obturation position where they close the orifices 50; —and an open position in which they leave said orifices clear. The mechanism making it possible to maneuver these obturator elements and synchronizing with the means 6 so that said elements pass from the obturation position to the open position when the airflow Fb is generated in the chamber 5.

The airflow Fb, containing lure, is expelled sequentially in order to simulate the breathing of a potential prey of the flying insect pests to be eliminated. The rhythm of these expirations excites the sensors of all the dipterans and thus makes it possible also to capture hematophages. The lure is therefore expelled into the atmosphere in alternation, according to a period that is predetermined. The expiration phases last for between 2 seconds and 15 seconds, and are interrupted by an idle phase, the duration of which is between 2 seconds and 1 minute. Such rates give very good results.

The insects attracted by the stimulus instinctively seek to reach the area where the lure has a maximum concentration, that is to say the hollow chamber 5. In practice, the insects fly at ground level, at a height that does not exceed 50 cm. Once they have arrived close to the source of the lure, they are directed almost vertically towards the chamber 5. In the context of the invention, they climb along the pipe 12.

The fan 13 functions without so that the pipe 12 continuously aspirates the airflow Fa. When, to reach the chamber 5, the insects attracted by the gaseous lure diffused in the surrounding ambient air fly close to the inlet 121, they are sucked into the pipe 12 and then held in the trap 2.

Consequently the advantage will be understood of first of all passing all the insects in the sucked airflow Fa before they reach the source of the lure. This novel capture tactic is therefore different from the one described in the aforementioned patent documents since in the latter the insects first of all reach the source of the lure before being sucked. This tactic of the prior art does not make it possible to obtain optimum results since some insects may reach the source of the lure and leave again without having been sucked.

Furthermore, installing the hollow chamber 5 and the inlet 121 at a height, at a distance from the ground advantageously less than or equal 3 meters, preferably between 1 meter and 3 meters, or between 0 and 2 meters; preferentially equal to 2 meters, makes the trap more visible to the targeted insect pests. On the other hand, in the aforementioned patent documents, the suction device and the lure diffusion device are close to the ground. These traps are therefore not very visible to the insects, thereby limiting their radius of action. This visibility is all the more reduced when small objects, such as hedges, are liable to conceal the apparatus.

It was seen previously that the structure 3 forms a physical barrier that prevents the expired airflow Fb, containing gaseous lure, from being taken up in the sucked airflow Fa. To reduce this takeup phenomenon ever further, provision is made for defusing the airflow Fb in a direction that is different from that of the sucked airflow Fa. The directions of these two flows Fa, Fb may be opposite. They may also be offset angularly by 20° to 90°. This is the reason why the hollow chamber 5 is disposed above the inlet 121 of the suction pipe 12 and why the orifices 50 are oriented towards the top of the apparatus 1. The gaseous lure can thus be spread over a wide area, in particular over a radius of action of approximately 50 m to 60 m, corresponding to a surface area of approximately 10,000 m².

Furthermore, diffusing the lure in a direction opposite to the airflow sucked through the pipe 12 offers the possibility of having different flow rates of the airflows Fa and Fb. This is because, to capture more insects, it appears advantageous for the airflow Fa sucked by the pipe 12 to be greater than the airflow Fb expired by the hollow chamber 5.

By disposing a plurality of these apparatuses 1 at judiciously chosen points, the capture technique according to the invention is therefore particularly suitable for forming a protective belt around a small urban community or an open public space, thus making it possible to preserve them from nuisances due to the targeted insect pests. Naturally the $CO_2$ supply may be particular to each apparatus 1 or be common to a plurality of apparatuses 1.

According to a preferred variant of the invention, the apparatus 1 (or each of the apparatuses 1) may comprise an electronic card suitable for providing its autonomous or programmed functioning. This electronic card may for example:

control the operating ranges of the apparatus 1 (or each of the apparatuses 1), and/or switch the electrical supply of the apparatus between the battery and an electrical distribution system, and/or receive an electronic signal including atmospheric data relating to the environment in which the apparatus 1 is situated; processing this electronic signal; and controlling the interruption of the functioning of the apparatus 1 when the electronic signal includes atmospheric data that are not favorable to the trapping of flying insect pests.

The atmospheric data in question may be the external temperature, the external humidity level, the atmospheric pressure, the wind speed, and the like. These data may come directly from sensors placed outside the apparatus 1 or come from local or regional meteorological stations, and/or enable the apparatuses 1 to communicate with each other, and/or remotely manage the functioning of the apparatus or apparatuses 1, for example by means of wireless communication means of the WiFi or 3G type or the like, and/or send messages on malfunctioning of the apparatus 1, with a view to rapid management of any malfunctioning.

It is also possible to conceive a smaller and/or more compact apparatus 1, particularly intended for private use, and for example intended to be placed on the ground, on a table, or attached to a tree. In this case, it will be understood that it is not necessary to position the lure diffuser and the suction devices at the top of a mast or in the very least that this mast may be of smaller size.

The arrangement of the various elements and/or means, and/or steps of the invention, in the embodiments described above, must not be understood as requiring such an arrangement in all implementations. In any event, it will understood that various modifications can be made to these elements and/or means and/or steps without departing from the spirit and scope of the invention. In particular:

The frame 10 is not necessarily parallelepipedal or cylindrical in shape. It may have any other shape suiting a person skilled in the art.

The frame 10 may be mounted on a tripod. It may also be provided with an attachment means of the type making it possible to suspend it from a tree, or to fix it to a wall support or to a barrier.

Provision may be made for connecting the apparatus 1 to a mains socket.

The suction pipe 12 is not necessarily rectilinear, but may have one or more curved portions.

The suction means 13 may be in the form of a vacuum pump.

The means 6 for generating the airflow Fb may be in the form of mechanically actuated bellows, or in the form of a pump.

The cap structure 3 is not necessarily conical, and may for example be cylindrical, like a lamp shade.

The hollow chamber 5 may have only one orifice 50.

The pipe 18 may emerge directly in the vessel 51.

The $CO_2$ may be diffused sequentially in the hollow chamber 5, for example at the same frequency as the functioning of the fan 6.

The pheromones may be used in the form of gas.

An electric element may be provided to heat the inside of the hollow chamber 5 and where applicable the refractory material that it contains.

The invention claimed is:

1. An apparatus for trapping flying insect pests, comprising:

a device for diffusing in the surrounding ambient air a gaseous lure the composition of which is suitable for attracting the insects;

a device for sucking a flow of surrounding ambient air containing the insects attracted by the diffused gaseous lure, said suction device comprising a suction duct having an inlet through which the insects are sucked, an insect trap arranged with the suction device so that the insects sucked by said device are retained in said trap, said diffusion device further comprising a cap structure surmounting the inlet of said suction pipe, a hollow chamber located at the upper end of said cap structure, wherein said cap structure channels the sucked airflow and forms a physical barrier which prevents the diffused lure from being taken up in said suction duct, said hollow chamber has at least one orifice emerging in the surrounding ambient air, and wherein said diffusion device further comprises a device for dispensing the gaseous lure inside the hollow chamber, at least a portion of the compounds of the lure being dispensed continuously in said hollow chamber, a device for generating an airflow in said hollow chamber so as to expel the gaseous lure out of said hollow chamber, through said orifice, said airflow being generated sequentially.

2. The apparatus according to claim 1, wherein the expired airflow containing gaseous lure is diffused in a direction that is different from that of the surrounding ambient airflow sucked by the suction device.

3. The apparatus according to claim 1, wherein the hollow chamber and the inlet are situated at a distance of less than 3 m, preferentially at a distance of between 1 m and 3 m, from the ground on which said apparatus rests.

4. The apparatus according to claim 1, wherein the suction device continuously sucks the flow of surrounding ambient air containing the insects attracted by the diffused gaseous lure.

5. The apparatus according to claim 1, wherein the flow rate of a flow of surrounding ambient air sucked by the suction device is greater than the flow rate of the airflow containing gaseous lure that is expired from the hollow chamber.

6. The apparatus according to claim 1, wherein the gaseous lure consists of a mixture of carbon dioxide gas and volatile pheromones, which volatile pheromones reproduce human skin odors.

7. The apparatus according to claim 6, wherein the pheromones are contained or impregnated in a pheromone carrier, said carrier being placed in the airflow generated in the hollow chamber so that said pheromones evaporate as said flow passes.

8. The apparatus according to claim 7, wherein the pheromones are used in the liquid state to impregnate the pheromone carrier, said carrier being porous.

9. The apparatus according to one of claim 6, wherein a source of carbon dioxide gas is suitable for continuously diffusing carbon dioxide gas in the hollow chamber.

10. The apparatus according to claim 1, wherein the hollow chamber is formed by, or contains, a refractory material suitable for storing heat and restoring it to the airflow generated in said chamber.

11. The apparatus according to claim 1, comprising an electronic card suitable for providing its autonomous or programmed functioning.

12. A method for trapping flying insect pests, comprising:
- diffusing in the surrounding ambient air a gaseous lure the composition of which is suitable for attracting the insects,
- sucking a surrounding ambient airflow containing the insects attracted by the diffused gaseous lure,
- retaining the sucked insects in a trap,
- wherein said method further comprises the steps:
- channeling the sucked airflow by means of a cap structure forming a physical barrier which prevents the diffused lure from being taken up in the sucked airflow,
- dispensing, continuously, all or part of the gaseous lure inside a hollow chamber,
- generating sequentially an airflow in the hollow chamber in order to expel the gaseous lure out of said chamber, into the surrounding ambient air.

* * * * *